UNITED STATES PATENT OFFICE.

EMIL VON DUNGERN, OF FRANKFORT-ON-THE-MAIN, GERMANY, ASSIGNOR TO THE FARBWERKE, VORM. MEISTER, LUCIUS & BRÜNING, OF HÖCHST-ON-THE-MAIN, GERMANY, A CORPORATION OF GERMANY.

MODIFIED MILK AND PROCESS OF OBTAINING SAME.

SPECIFICATION forming part of Letters Patent No. 700,631, dated May 20, 1902.

Application filed December 4, 1900. Serial No. 38,685. (No specimens.)

*To all whom it may concern:*

Be it known that I, EMIL VON DUNGERN, M. D., a citizen of the Empire of Germany, residing at Frankfort-on-the-Main, Germany, have invented certain new and useful Improvements in Modified Milk and Process of Obtaining Same, of which the following is a specification.

Endeavors have been made of late to render cow's and goat's milk more suitable for the nourishment of children and invalids. An essential objection to such milk, however, has not hitherto been overcome. It consists in the fact that cow's and goat's milk produce with gastric juice a coarse coagulum, which resists the penetration of the digesting juice much more effectively than does the fine flaky solid matter of human milk. The coarse casein coagula remain undigested for a long time in the stomach and bowels and are generally considered to give rise to indigestion with delicate children. This injurious quality of cow's milk has hitherto been combated by an addition of mucilage and fats. Attempts have also been made to overcome it by removing the precipitated casein or by rendering the casein digestible by adding pancreatin to the milk. The first method has the disadvantage that these additions are badly borne by children during prolonged administration, and the second that the removal of the casein takes the greatest part of the nourishment in the milk, while the artificial digestion necessitates conditions which render its general application out of the question.

I have found that the injurious coagulation in the form of lumps of the casein of cow's and goat's milk in the stomach may be avoided in a simple manner.

To the milk, which may be boiled, is added some rennet ferment. After a few minutes a compact coagulum is formed. This curd is then shaken and beaten, by which means the coarse coagulum is broken up within a short time, so that only flakes remain in suspension, as is the case with mother's milk. The milk thus treated can no longer coagulate coarsely in the stomach. For the rest it does not differ in composition, taste, or appearance from ordinary milk. Thus a milk is obtained more digestible than ordinary milk and the milk preparations hitherto employed.

Having now described my invention, what I claim is—

1. The herein-described process of treating cow's or goat's milk to render it more digestible by infants and invalids, which consists in adding a rennet ferment to the milk, whereby the same is separated into whey and a casein coagulate, and then mechanically breaking up said coagulate into fine flakes so that only fine flakes remain in suspension in the whey, substantially as set forth.

2. As a new product, cow's or goat's milk, containing whey, and a casein coagulate in fine flakes held in suspension in said whey, said milk resembling the original milk in composition, taste and appearance, substantially as set forth.

In testimony that I claim the foregoing as my invention I have signed my name in presence of two subscribing witnesses.

EMIL VON DUNGERN.

Witnesses:
JEAN GRUND,
CARL GRUND.